US010353766B2

(12) United States Patent
Ding et al.

(10) Patent No.: US 10,353,766 B2
(45) Date of Patent: Jul. 16, 2019

(54) MANAGING EXECUTION OF COMPUTER TASKS UNDER TIME CONSTRAINTS

(71) Applicant: International Business Machines Corporation, Armonk, NY (US)

(72) Inventors: Zhaohui Ding, Beijing (CN); Kai Huang, Beijing (CN); Jun Hua Jiang, Beijing (CN); Da Xu, Beijing (CN); Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/260,402

(22) Filed: Sep. 9, 2016

(65) Prior Publication Data
US 2018/0074883 A1    Mar. 15, 2018

(51) Int. Cl.
G06F 11/07 (2006.01)
G06F 9/52 (2006.01)
G06F 9/50 (2006.01)

(52) U.S. Cl.
CPC ........ *G06F 11/0793* (2013.01); *G06F 9/5044* (2013.01); *G06F 9/5066* (2013.01); *G06F 9/52* (2013.01); *G06F 11/079* (2013.01); *G06F 11/0745* (2013.01); *G06F 11/0751* (2013.01); *G06F 2209/481* (2013.01); *G06F 2209/506* (2013.01)

(58) Field of Classification Search
CPC combination set(s) only.
See application file for complete search history.

(56) References Cited

U.S. PATENT DOCUMENTS

| 5,784,613 | A | * | 7/1998 | Tamirisa | G06F 9/3861 712/E9.06 |
| 7,032,099 | B1 | * | 4/2006 | Imamura | G06F 9/52 712/29 |
| 8,024,395 | B1 | * | 9/2011 | Odom | G06F 9/5072 709/201 |
| 8,112,751 | B2 | | 2/2012 | Leijen et al. | |
| 8,352,271 | B2 | * | 1/2013 | Bells | G10L 13/00 704/258 |
| 8,359,604 | B2 | * | 1/2013 | Duffy | G06F 9/3865 719/318 |
| 9,304,778 | B2 | * | 4/2016 | Duffy | G06F 13/24 |

(Continued)

FOREIGN PATENT DOCUMENTS

CN    102799475 B    1/2015

OTHER PUBLICATIONS

Ding et al., "Managing Execution of Computer Tasks Under Time Constraints", U.S. Appl. No. 15/890,441, filed Feb. 7, 2018.

(Continued)

Primary Examiner — Amine Riad
(74) Attorney, Agent, or Firm — David B. Woycechowsky

(57) ABSTRACT

A computer-implemented method comprises identifying a computer task; determining a hardware exception source associated with the computer task; determining an exception unit associated with the hardware exception source; determining a parallelization factor associated with the hardware exception source; and determining a parallel execution scenario associated with the computer task based on the exception unit and the parallelization factor. A corresponding computer program product and computer system are also disclosed.

20 Claims, 4 Drawing Sheets

(56) References Cited

U.S. PATENT DOCUMENTS

| | | | | |
|---|---|---|---|---|
| 9,406,040 B2* | 8/2016 | Ritter | | G06Q 10/06316 |
| 9,424,212 B2* | 8/2016 | Raffman | | G06F 9/5083 |
| 9,904,581 B2* | 2/2018 | Michael | | G06F 9/5038 |
| 2006/0277552 A1* | 12/2006 | Nall | | G06F 9/4812 |
| | | | | 718/108 |
| 2007/0214394 A1 | 9/2007 | Gross et al. | | |
| 2008/0115138 A1* | 5/2008 | Nachimuthu | | G06F 9/4812 |
| | | | | 718/102 |
| 2008/0126650 A1* | 5/2008 | Swanson | | G06F 9/542 |
| | | | | 710/267 |
| 2010/0185840 A1* | 7/2010 | Duffy | | G06F 9/3865 |
| | | | | 712/244 |
| 2010/0269110 A1 | 10/2010 | Leijen et al. | | |
| 2010/0306776 A1 | 12/2010 | Greene | | |
| 2011/0078691 A1* | 3/2011 | Yildiz | | G06F 9/461 |
| | | | | 718/103 |
| 2011/0258628 A1 | 10/2011 | Devadhar | | |
| 2011/0289503 A1* | 11/2011 | Toub | | G06F 9/4843 |
| | | | | 718/102 |
| 2015/0094968 A1* | 4/2015 | Jia | | G06Q 40/04 |
| | | | | 702/60 |
| 2015/0293953 A1* | 10/2015 | Wicks | | G06F 17/30312 |
| | | | | 707/704 |
| 2016/0357689 A1* | 12/2016 | Raffman | | G06F 9/5083 |
| 2017/0004005 A1* | 1/2017 | Elliott | | G06F 9/4812 |

OTHER PUBLICATIONS

List of IBM Patents or Patent Applications Treated as Related, filed Feb. 7, 2018, 2 pages.

Xu et al., "Optimization for Speculative Execution of Multiple Jobs in a MapReduce-like Cluster", arXiv: 1406.0609v3 [cs.DC] Jan. 5, 2015, 10 pages, <http://arxiv.org/pdf/1406.0609.pdf>.

* cited by examiner

MANAGING EXECUTION OF COMPUTER TASKS UNDER TIME CONSTRAINTS

BACKGROUND

The present invention relates generally to the field of computer processing systems, and more particularly to managing execution of computer tasks under time constraints.

In computer processing systems, managing execution of computer tasks under time constraints is of critical importance to users of computer tasks. When a task is time-constrained, exceptions and/or delay could be vital to reliable operation of the computer systems. Developers and users of computer systems continue to have difficulties with managing execution of computer tasks under time constraints in computer processing systems.

SUMMARY

A computer-implemented method comprises identifying a computer task; determining a hardware exception source associated with the computer task; determining an exception unit associated with the hardware exception source; determining a parallelization factor associated with the hardware exception source; and determining a parallel execution scenario associated with the computer task based on the exception unit and the parallelization factor. A corresponding computer program product and computer system are also disclosed.

DETAILED DESCRIPTION

Figure 1:
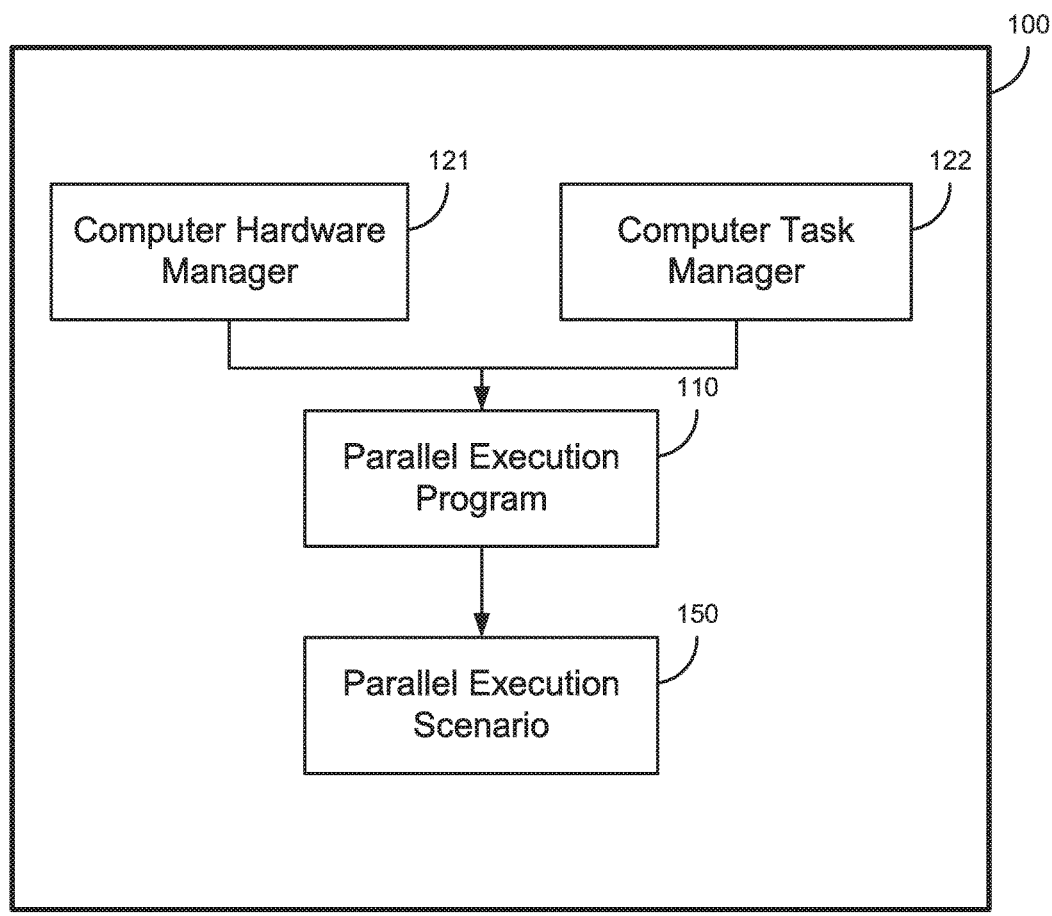
FIG. 1 is a block diagram of one embodiment of a computer system environment suitable for operation of a parallel execution program, in accordance with at least one embodiment of the present invention.

FIG. 1 is a block diagram of a computer system environment 100 suitable for operating a parallel execution program 110, in accordance with at least one embodiment of the present invention. In the computer system environment 100 depicted in FIG. 1, a computer hardware manager 121 is any combination of one or more computer components that manage the allocation of at least one computer hardware component to the execution of at least one computer program. A computer task manager 122 is any combination of one or more computer components that manage at least one property associated with the execution of at least one computer task (i.e., a set of one or more computer program instructions). The program 110 uses information provided by the computer hardware manager 121 and the computer task manager 122 to determine a parallel execution scenario 150. In at least some embodiments, a parallel execution scenario 150 is any recommendation for execution of at least one computer task on two or more computer units, wherein a computer unit is a combination of one or more computer (hardware and/or software) components.

Figure 2:
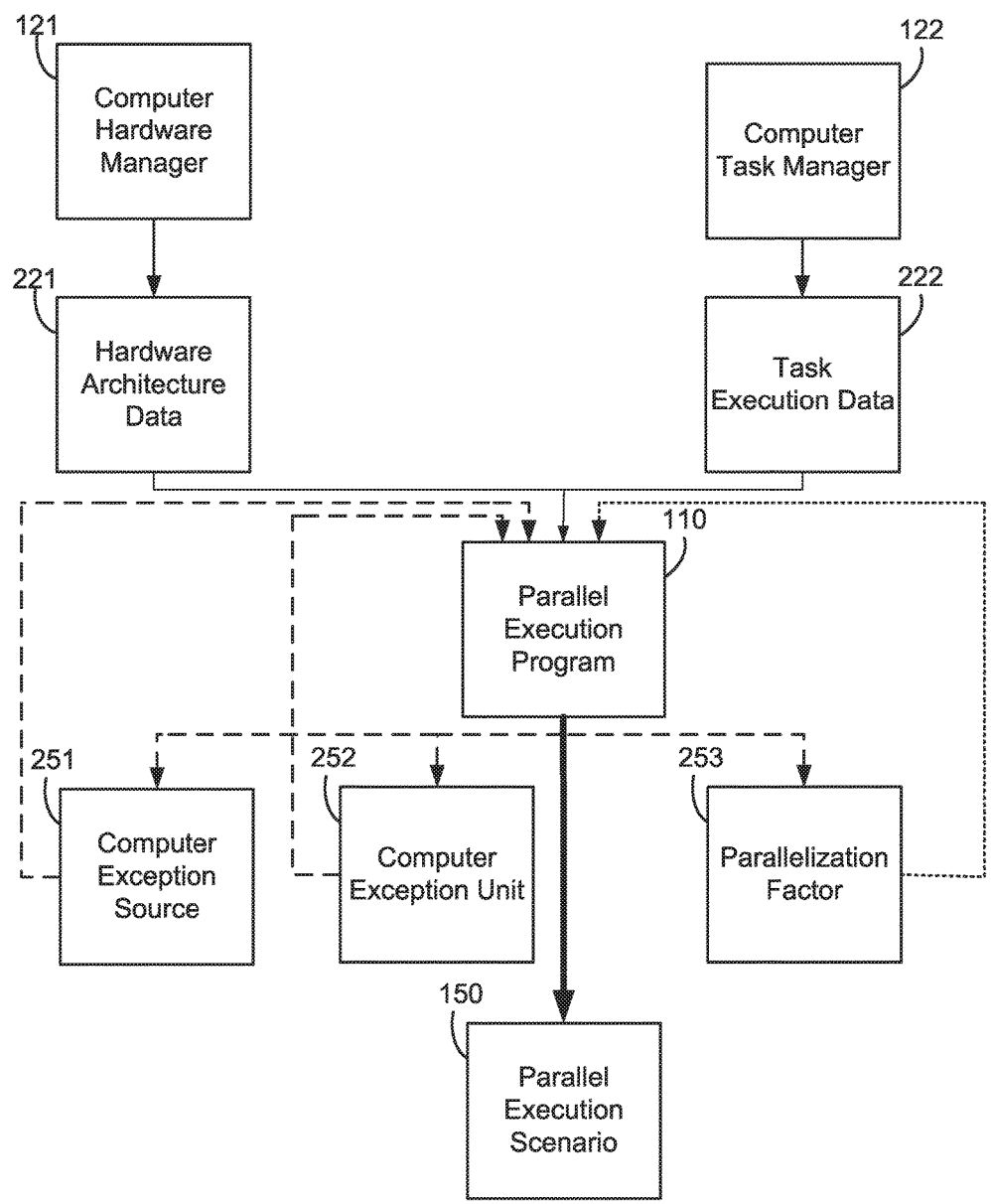
FIG. 2 is a data flow diagram of a parallel execution program, in accordance with at least one embodiment of the present invention.

FIG. 2 is a data-flow diagram of a parallel execution program 110, in accordance with at least one embodiment of the present invention. In the embodiment depicted in FIG. 2, the program 110 receives hardware architecture data 221 (i.e., information about the hardware makeup of the computer system within which the program 110 is located) from the computer hardware manager 121, and task execution data 222 (i.e., information about the tasks under execution or planned to be executed by the computer system within which the program 110 is located) from the computer task manager 122. The program 110 uses the hardware architecture data 221 and the task execution data 222 to determine a computer exception source (i.e., a determination about a combination of one or more computer components that are recognized as the source of an exception and/or an error in the execution of at least one computer task). The program 110 then uses the hardware exception source 251 to determine a computer exception unit 252 (i.e., a determination about a hypothetical set of one or more computer components that the at least one computer task needs to be run on in a parallel manner to reduce the possibility of the reoccurrence of the exception underlying the hardware exception source 251). The program 110 determines a parallelization factor (i.e., a determination about the recommended and/or required number of computer units designed based on the hardware exception unit 252 on which the parallel execution of the at least one task should be performed). The program 110 uses the computer exception unit 252 and the parallelization factor 253 to determine a parallel execution scenario 150 (e.g., a plan for executing the at least one computer task on X computer exception units 252, wherein X=parallelization factor 253).

Figure 3:
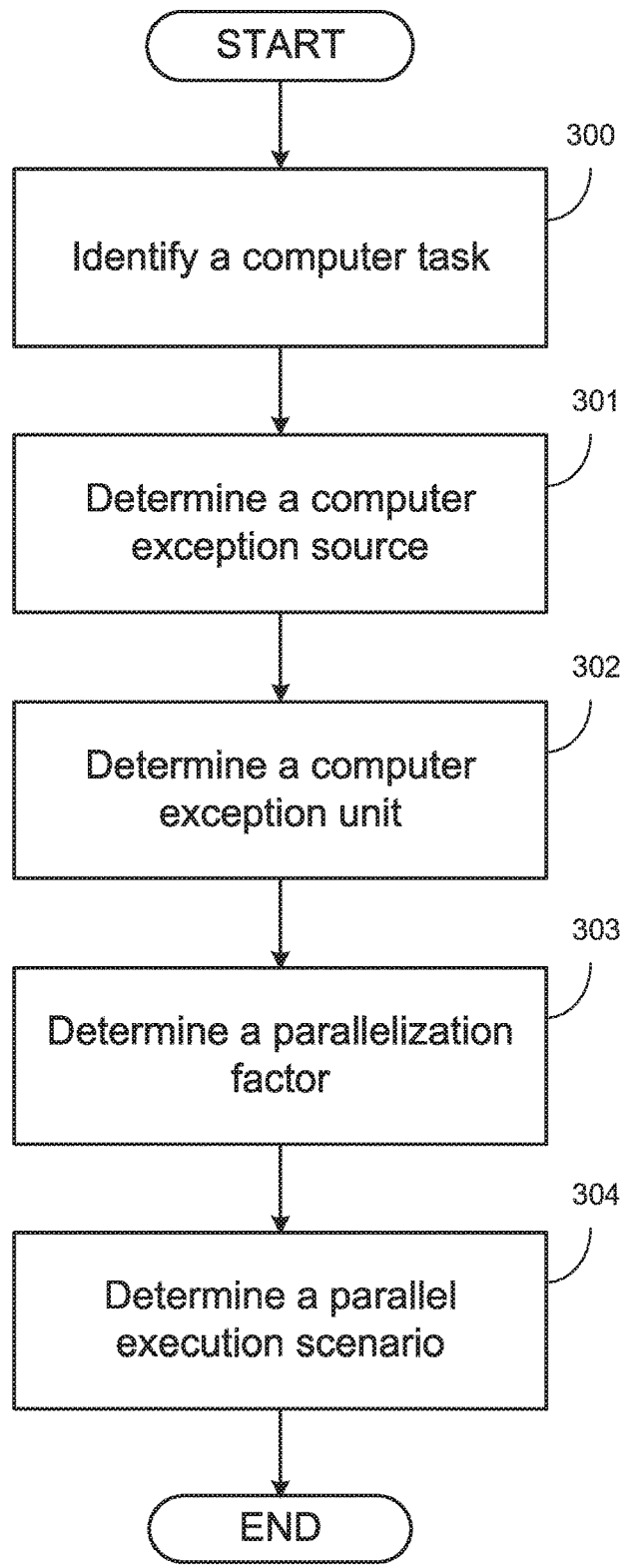
FIG. 3 is a flowchart diagram of a parallel execution program, in accordance with at least one embodiment of the present invention.

FIG. 3 is a flow-chart diagram of a parallel execution program, in accordance with at least one embodiment of the present invention. At step 300, the program identifies a computer task. A step 301, the program determines a computer exception source associated with the computer task. At step 302, the program determines a computer exception unit associated with the computer exception unit based on the computer exception source. At step 303, the program determines a parallelization factor associated with the computer exception source. At step 304, the program determines a parallel execution scenario associated with the computer task based on the computer exception unit and the parallelization factor.

In some embodiments, the computer exception source is an operating system failure, and the computer exception unit is a computer system (i.e., with storage and processing capabilities connected to each other). In some embodiments, the computer exception source is a network failure and the computer exception unit is a computer network system. In some embodiments, the computer exception source is a file system failure, and the computer exception unit is a file system. In some embodiments, the computer exception source is a storage failure, and the computer exception unit is a computer storage system.

The parallel execution program identifies a computer task at step 300. In some embodiments, the program identifies the computer task by accessing a configuration file. In some embodiments, the program identifies the computer task by communicating with an operating system. In some embodiments, the program identifies the computer task maintains a repository of the computer tasks under execution and/or planned to be executed.

The parallel execution program determines a computer exception source at step 301. In some embodiments, the program communicates with a computer hardware manager to determine a computer exception source. In some embodiments, the program maintains a repository of correlations between particular exceptions and the computer exception sources for such errors. In some embodiments, determining a computer exception source comprises detecting an exception associated with the computer task. In some embodiments, determining a computer exception source comprises determining at least one property (i.e., the type) associated with a computer exception.

The parallel execution program determines a computer exception unit at step 302. In some embodiments, determining the computer exception unit comprises modeling the portions of a computer system affected by a particular exception determined to be associated with a computer exception source. In some embodiments, determining the computer exception unit comprises modeling the portions of a computer system that cannot reliably be ruled out as being impacted and/or being caused by a particular exception determined to be associated with a computer exception source. In some embodiments, the program maintains a repository of correlations between particular computer exception sources and their corresponding computer exception unit formulations, and uses that repository to determine a computer exception unit based on the computer exception source. In some embodiments, the parallel execution program determines an exception impact indicator (i.e., a determination of one or more hardware components that are impacted by an exception and/or an error) and the computer exception unit is determined based on the exception impact indicator.

The parallel execution program determines a parallelization factor at step 303. In some embodiments, the program determines an exception occurrence frequency indicator (i.e., a determination about how often a particular exception is likely to occur, for instance based on historic data) associated with the computer exception source, and the parallelization factor is determined based on the exception occurrence frequency indicator. In some embodiments, the program determines the parallelization factor based on at least one property (e.g., the type and/or source) associated with the computer exception source and/or the computer exception unit.

The parallel execution program determines a parallel execution scenario at step 304. In some embodiments, the program determines a parallel execution scenario by using at least one of the computer hardware data and the task execution data. In some embodiments, the program determines a parallel execution scenario using at least one information artefact provided by at least one other computer component and/or at least one computer user. In some embodiments, the program displays information about the parallel execution scenario to a user. In some embodiments, the program provides information about the parallel execution scenario to at least one computer component, including at least one other computer software application.

In some embodiments, the parallel execution program operates as part of an operating system software or other software managing the execution of at least one computer task. In some embodiments, the parallel execution program operates as a stand-alone software solution, for instance communicating with an operating system software or other software managing the execution of at least one computer task.

Embodiments of the present invention enable efficient parallel execution of time-constrained computer tasks in a manner that ensures desired levels of reliability specified by users and/or performance requirements of a computer system. Nevertheless, the aforementioned advantages are not required to be present in all of the embodiments of the invention and may not be present in all of the embodiments of the invention.

In some embodiments, the parallel execution program operates as part of a software development platform, while in other embodiments the parallel execution program is part of a stand-alone software component that communicates with a software development platform and/or can be optionally added as an add-on program to the software development platform. In general, one or more steps associated with different embodiments of the parallel execution program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the parallel execution program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Figure 4:
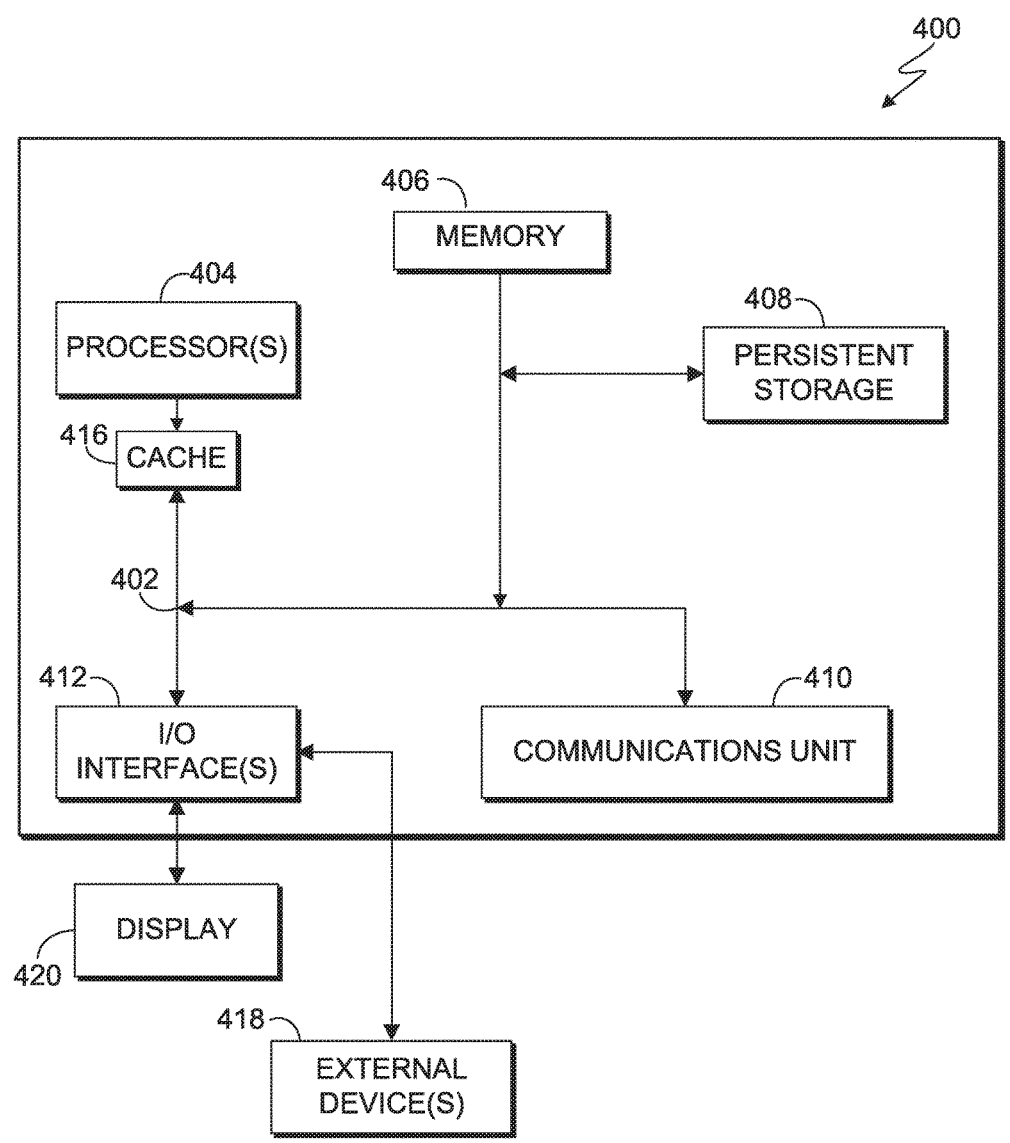
FIG. 4 is a block diagram of a computing apparatus suitable for executing a parallel execution program, in accordance with at least one embodiment of the present invention.

FIG. 4 is a block diagram depicting components of a computer 400 suitable for executing the parallel execution program. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the parallel execution program may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The parallel execution program may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a computer task;
   determining a computer task exception unit, with the determination of the computer task exception unit including:
      receiving a computer exception data set, with the computer exception data set including information indicative of a given computer exception being associated with a given computer exception source, and
      responsive to the receipt of the computer exception data set, modeling the portions of a first computer system affected by the given computer exception that is associated with the given computer exception source;
   determining a parallelization factor, based, at least in part, upon the modeled portions of the first computer system;
   allocating a quantity N computer task exception units to parallel perform the computer task; and
   performing the computer task in parallel on the N computer task exception units.

2. The computer-implemented method of claim 1, wherein:
   the modeled portions of the first computer system includes information indicative of the portions of the first computer system that are yet to be determined to be impacted by a computer exception source;
   the historical computer task error data includes an instance of an operating system failure; and
   the computer task exception unit is a computer system.

3. The computer-implemented method of claim 1, wherein:
   the historical computer task error data includes an instance of a network failure; and
   the computer task exception unit is a computer network system.

4. The computer-implemented method of claim 1, wherein:
   the historical computer task error data includes an instance of a file system failure.

5. The computer-implemented method of claim 1, wherein:
   the historical computer task error data includes an instance of a storage failure; and
   the computer task exception unit is a computer storage system.

6. The computer-implemented method of claim 1, further comprising:
   determining an exception impact indicator that reflects the impact that an occurrence of an exception in a computer task exception unit has on performing the computer task in a timely manner.

7. The computer-implemented method of claim 1, further comprising:
   determining an exception occurrence frequency indicator;
   wherein the parallelization factor is determined based on the exception occurrence frequency indicator.

8. A computer program product comprising:
   a non-transitory machine readable storage device; and
   computer code stored on the non-transitory machine readable storage device, with the computer code including instructions for causing a processor(s) set to perform operations including the following:
   identifying a computer task,
   determining a computer task exception unit, with the determination of the computer task exception unit including:
      receiving a computer exception data set, with the computer exception data set including information indicative of a given computer exception being associated with a given computer exception source, and
      responsive to the receipt of the computer exception data set, modeling the portions of a first computer system affected by the given computer exception that is associated with the given computer exception source,
   determining a parallelization factor, based, at least in part, upon the modeled portions of the first computer system,
   allocating a quantity N computer task exception units to parallel perform the computer task, and performing the computer task in parallel on the N computer task exception units.

9. The computer program product of claim 8, wherein:
the modeled portions of the first computer system includes information indicative of the portions of the first computer system that are yet to be determined to be impacted by a computer exception source;
the historical computer task error data includes an instance of an operating system failure; and
the computer task exception unit is a computer system.

10. The computer program product of claim 8, wherein:
the historical computer task error data includes an instance of a network failure; and
the computer task exception unit is a computer network system.

11. The computer program product of claim 8, wherein:
the historical computer task error data includes an instance of a file system failure.

12. The computer program product of claim 8, wherein:
the historical computer task error data includes an instance of a storage failure; and
the computer task exception unit is a computer storage system.

13. The computer program product of claim 8, wherein the computer code further includes instructions for causing the processor(s) set to perform the following operations:
determining an exception impact indicator that reflects the impact that an occurrence of an exception in a computer task exception unit has on performing the computer task in a timely manner.

14. The computer program product of claim 8, wherein the computer code further includes instructions for causing the processor(s) set to perform the following operations:
determining an exception occurrence frequency indicator;
wherein the parallelization factor is determined based on the exception occurrence frequency indicator.

15. A computer system comprising:
a processor(s) set;
a machine readable storage device; and
computer code stored on the machine readable storage device, with the computer code including instructions for causing the processor(s) set to perform operations including the following:
identify a computer task,
determining a computer task exception unit, with the determination of the computer task exception unit including:
receiving a computer exception data set, with the computer exception data set including information indicative of a given computer exception being associated with a given computer exception source, and
responsive to the receipt of the computer exception data set, modeling the portions of a first computer system affected by the given computer exception that is associated with the given computer exception source,
determining a parallelization factor, based, at least in part, upon the modeled portions of the first computer system,
allocating a quantity N computer task exception units to parallel perform the computer task, and
performing the computer task in parallel on the N computer task exception units.

16. The computer system of claim 15, wherein:
the modeled portions of the first computer system includes information indicative of the portions of the first computer system that are yet to be determined to be impacted by a computer exception source;
the historical computer task error data includes an instance of an operating system failure; and
the computer task exception unit is a computer system.

17. The computer system of claim 15, wherein:
the historical computer task error data includes an instance of a network failure; and
the computer task exception unit is a computer network system.

18. The computer system of claim 15, wherein:
the historical computer task error data includes an instance of a file system failure.

19. The computer system of claim 15, wherein:
the historical computer task error data includes an instance of a storage failure; and
the computer task exception unit is a computer storage system.

20. The computer system of claim 15, wherein the computer code further includes instructions for causing the processor(s) set to perform the following operations:
determining an exception impact indicator that reflects the impact that an occurrence of an exception in a computer task exception unit has on performing the computer task in a timely manner.

* * * * *